US008407450B2

(12) United States Patent
Jaekwan

(10) Patent No.: US 8,407,450 B2
(45) Date of Patent: Mar. 26, 2013

(54) ELECTRONIC DEVICE, TIME DIFFERENCE DATA ACQUISITION METHOD, AND DATA STRUCTURE FOR TIME DIFFERENCE DATA

(75) Inventor: Oh Jaekwan, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 438 days.

(21) Appl. No.: 12/716,528

(22) Filed: Mar. 3, 2010

(65) Prior Publication Data

US 2010/0228948 A1 Sep. 9, 2010

(30) Foreign Application Priority Data

Mar. 6, 2009 (JP) ................................ 2009-053908

(51) Int. Cl.
*G06F 12/00* (2006.01)
*G06F 13/00* (2006.01)

(52) U.S. Cl. ........ 711/221; 711/205; 711/207; 711/209; 711/111; 711/114; 711/100; 711/E12.096; 340/539.13; 342/357.22; 342/357.34; 342/357.39; 342/357.44

(58) Field of Classification Search .................. 711/221, 711/205, 207, 209, 111, 114, 100, E12.096; 340/539.13; 342/357.22, 357.34, 357.39, 342/357.44
See application file for complete search history.

(56) References Cited

U.S. PATENT DOCUMENTS

2012/0051190 A1* 3/2012 Akiyama ........................ 368/21

FOREIGN PATENT DOCUMENTS

| | | |
|---|---|---|
| EP | 2 085 835 A2 | 8/2009 |
| JP | 08-068848 | 3/1996 |
| JP | 2003-139875 | 5/2003 |

* cited by examiner

*Primary Examiner* — Midys Rojas

(57) ABSTRACT

An electronic device receives satellite signals from positioning information satellites and acquires positioning information and time information. A stored data table comprises a first block of data having a first array of time difference data and a second block of data having a second array of time difference data that is different than the first array of time difference data. A stored memory address table stores the memory address of each of the first and second blocks of data, at least one the blocks of data being stored a plurality of times in the memory address table. The data block corresponding to the acquired positioning information is identified, the memory address corresponding to that data block is read, the data block data indicated by the memory address is acquired, and the time difference data for the segment corresponding to the positioning information is acquired from the data block.

7 Claims, 10 Drawing Sheets

<TIME DIFFERENCE TABLE>

| | B0 | B0 | B0 | B0 | B1 | B1 | B1 | B1 |
|---|---|---|---|---|---|---|---|---|
| SEGMENT | 0 | 1 | 2 | 3 | 4 | 5 | 6 | 7 |
| 0 | 0 | 0 | 0 | 0 | 0 | 0 | 0 | 0 |
| 1 | 0 | 0 | 0 | 0 | 0 | 0 | 0 | 0 |
| 2 | 0 | 0 | 0 | 0 | 0 | 0 | 0 | 0 |
| 3 | 0 | 0 | 0 | 0 | 0 | 0 | 0 | 0 |
| 4 | 0 | 0 | 0 | 0 | +1 | +1 | +1 | +1 |
| 5 | 0 | 0 | 0 | 0 | +1 | +1 | +1 | +1 |
| 6 | 0 | 0 | 0 | 0 | +1 | +1 | +1 | +1 |
| 7 | 0 | 0 | 0 | 0 | +1 | +1 | +1 | +1 |
| 8 | 0 | 0 | 0 | 0 | +1 | 0 | 0 | 0 |
| 9 | 0 | 0 | 0 | 0 | +1 | 0 | 0 | 0 |
| 10 | 0 | 0 | 0 | 0 | 0 | 0 | 0 | 0 |
| 11 | 0 | 0 | 0 | 0 | 0 | 0 | 0 | 0 |
| 12 | +1 | +1 | +1 | +1 | +1 | +1 | +1 | +1 |
| 13 | +1 | +1 | +1 | +1 | +1 | +1 | +1 | +1 |
| 14 | +1 | +1 | +1 | +1 | +1 | +1 | +1 | +1 |
| 15 | +1 | +1 | +1 | +1 | +1 | +1 | +1 | +1 |
| | B1 | B1 | B1 | B1 | B2 | B1 | B1 | B1 |

FIG. 7

<DATA TABLE>

55

| INDEX | 0 | 1 | 2 | 3 | 4 | 5 | 6 | 7 |
|---|---|---|---|---|---|---|---|---|
| B0 | 0 | 0 | 0 | 0 | 0 | 0 | 0 | 0 |
| B1 | 0 | 0 | 0 | 0 | +1 | +1 | +1 | +1 |
| B2 | +1 | +1 | 0 | 0 | +1 | +1 | +1 | +1 |

FIG. 8

55

| | | | | | | |
|---|---|---|---|---|---|---|
| NUMBER OF TIMES THE TIME DIFFERENCE CHANGES | FIRST TIME DIFFERENCE | FIRST INDEX TO THE SECOND TIME DIFFERENCE | SECOND TIME DIFFERENCE | . . . | FIRST INDEX TO THE n-th TIME DIFFERENCE | n-th TIME DIFFERENCE |

FIG. 9

<DATA TABLE>

| | | | | | | |
|---|---|---|---|---|---|---|
| B0 | 0 | 0 | | | | |
| B1 | 1 | 0 | 4 | +1 | | |
| B2 | 2 | +1 | 2 | 0 | 4 | +1 |

55

FIG.10

<TIME DIFFERENCE TABLE>

| | 0 | 1 | 2 | 3 | 4 | 5 | 6 | 7 |
|---|---|---|---|---|---|---|---|---|
| A | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 0 | 0 | 0 | 0 | +1 | +1 | +1 | +1 |
| | 0 | 0 | 0 | 0 | +1 | +1 | +1 | +1 |
| | 0 | 0 | 0 | 0 | +1 | +1 | +1 | +1 |
| | 0 | 0 | 0 | 0 | +1 | +1 | +1 | +1 |
| B | 0 | 0 | 0 | 0 | +1 | 0 | 0 | 0 |
| | 0 | 0 | 0 | 0 | +1 | 0 | 0 | 0 |
| | 0 | 0 | 0 | 0 | 0 | 0 | 0 | 0 |
| | 0 | 0 | 0 | 0 | 0 | 0 | 0 | 0 |
| | +1 | +1 | +1 | +1 | +1 | +1 | +1 | +1 |
| | +1 | +1 | +1 | +1 | +1 | +1 | +1 | +1 |
| | +1 | +1 | +1 | +1 | +1 | +1 | +1 | +1 |
| | +1 | +1 | +1 | +1 | +1 | +1 | +1 | +1 |

FIG.11

<OFFSET TABLE>

51

| | 0 | 1 | 2 | 3 | 4 | 5 | 6 | 7 |
|---|---|---|---|---|---|---|---|---|
| A | 0x0000 | 0x0000 | 0x0000 | 0x0000 | 0x0002 | 0x0002 | 0x0002 | 0x0002 |
| B | 0x0002 | 0x0002 | 0x0002 | 0x0002 | 0x0006 | 0x0002 | 0x0002 | 0x0002 |

FIG.12

<DATA TABLE>

55

| | | | | | | |
|---|---|---|---|---|---|---|
| 0x0000 | 0 | 0 | | | | |
| 0x0002 | 1 | 0 | 4 | +1 | | |
| 0x0006 | 2 | +1 | 2 | 0 | 4 | +1 |

FIG.13

ELECTRONIC DEVICE, TIME DIFFERENCE DATA ACQUISITION METHOD, AND DATA STRUCTURE FOR TIME DIFFERENCE DATA

CROSS-REFERENCE TO RELATED APPLICATION(S)

Japanese Patent application No. 2009-053908 is hereby incorporated by reference in its entirety.

BACKGROUND

1. Field of Invention

The present invention relates to an electronic device, a time difference data acquisition method, and a data structure for time difference data.

2. Description of Related Art

The Global Positioning System (GPS) for determining the position of a GPS receiver uses GPS satellites that circle the Earth on known orbits, and each GPS satellite has an atomic clock on board. Each GPS satellite therefore keeps the time (referred to below as the GPS time or satellite time information) with extremely high precision.

All GPS satellites transmit the same GPS time, and the Coordinated Universal Time (UTC) is acquired by adding the UTC offset (currently +15 seconds) to the GPS time. For an electronic timepiece to receive a satellite signal transmitted from a GPS satellite, acquire the GPS time, and display the local time (regional time) at the location where the electronic timepiece is being used, the time difference to the UTC must be added after correcting for the UTC offset in order to get the current local time, and the electronic timepiece must therefore know what this time difference is.

The UTC offset can be acquired from the data in the received satellite signal, or a predetermined value stored in ROM may be used.

Radio-controlled timepieces and navigation systems that acquire positioning information and time information (UTC) using satellite signals transmitted from GPS satellites, obtain the time difference at the current location from the acquired positioning information, and calculate and display the local time are known from the literature. See, for example, Japanese Unexamined Patent Appl. Pub. JP-A-H08-68848 and Japanese Unexamined Patent Appl. Pub. JP-A-2003-139875.

JP-A-H08-68848 teaches acquiring the time difference information by comparing the positioning data with boundary information data. In order to avoid detecting the wrong time difference information, the device taught in JP-A-H08-68848 must store boundary line information for all time zones in the world in a local storage device.

However, the borders between time zones are often winding national borders, and the amount of data required to store all time zone boundaries is immense. Such boundary line data therefore cannot be stored in small electronic devices such as wristwatches because the available storage capacity is limited by both size and cost constraints. The technology taught in JP-A-H08-68848 is therefore limited in the types of devices in which it can be used, and the technology can more particularly not be used in electronic devices such as wristwatches.

JP-A-2003-139875 teaches extracting fixed position information that is closest to the position of the mobile device to acquire the time difference for that location. More particularly, a circular range is set centered on a fixed position, and if the position of the mobile device is within this range, the time difference for that fixed position is set and used. The possibility of setting the wrong time zone (time difference) is therefore high in areas where the time zone borders are intertwined.

In order to adjust the size of these circular areas, distances are normalized using a weighting coefficient referred to as "fixed range information." However, when in areas where time zone borders intertwine and there are multiple fixed positions around and near the location of the mobile device, it is difficult to set the fixed ranges so that detection errors do not occur, and the amount of data required to do so increases.

Furthermore, because the distance between the mobile device and each fixed position must be calculated, the calculations are complicated and time-consuming when there are multiple fixed positions in the vicinity of the mobile device, and the technology cannot be used in electronic devices such as wristwatches using low performance processors.

SUMMARY OF INVENTION

An electronic device, a time difference data acquisition method, and a data structure for time difference data according to the present invention enable reducing the amount of time difference data and reducing the required storage capacity while maintaining accuracy, simplify the calculation process, and enable even small electronic devices with a low performance processor to determine the time difference in a short time.

A first aspect of the invention is an electronic device having a reception unit that can receive satellite signals transmitted from positioning information satellites and acquire positioning information and time information; a time difference data storage means in which a data table and a memory address table are stored; and a time difference data acquisition means that acquires time difference data corresponding to positioning information acquired by the reception unit from the time difference data storage means. The data table is compiled by dividing geographical information to which time difference data is assigned into segments of a constant size, setting only one time difference in each segment, grouping the segments into blocks each containing a specific number of segments, and storing the time difference data of each segment as block data by block unit while storing the block data only once for blocks containing the same time difference data array and storing the block data for mutually different time difference data arrays once each. The memory address table stores the memory address where the block data for each block is stored in the data table. The time difference data acquisition means identifies the block corresponding to the positioning information acquired by the reception unit, reads the memory address corresponding to said block from the memory address table, acquires the block data indicated by the memory address in the data table, and acquires the time difference data for the segment corresponding to the positioning information from said block data.

This aspect of the invention divides time difference regions (time zones) into segments of a specific size, assigns the same time difference to the area within each segment, groups plural segments into blocks, and stores the block data in a data table. Because the time difference is set referenced to longitude, adjacent blocks often contain the same time difference data. As a result, because blocks containing the same data can be stored only once in the data table, the location in memory where the block data for each block is stored is stored in the memory address table and the block data can be read using this address, the amount of data to be stored can be greatly reduced. Therefore, time difference data with the required accuracy can be stored even in an electronic device such as a wristwatch in which the capacity of the external memory is constrained by size or cost.

Furthermore, by setting the segment width and the block width to widths that are easy to calculate, processing in a short time is possible even in low performance systems that do not have a processor that can process floating point, multiplication, division, and similar operations. As a result, the invention can be used in small electronic devices, such as a wristwatch, that must use a system with low performance in terms of power consumption and cost.

In an electronic device according to another aspect of the invention, each unit of block data stored in the data table includes a number of times the time difference changes in that block data unit, the first time difference value, the first index of the n-th time difference value, and the n-th time difference value, where n is an integer of 2 or more.

This aspect of the invention can further reduce the amount of data to be stored because the block data can be compressed and stored in the data table. In addition, because the number of times the time difference changes and the first index of the same consecutive time difference are stored, time difference data for a particular segment inside each block data unit can be easily acquired by a comparison operation.

Further preferably in an electronic device according to another aspect of the invention, the time difference data acquisition means calculates and determines the index of the block corresponding to the acquired positioning information using longitude and latitude information to which the index of each block in the memory address table is referenced, size information for the latitudinal direction and longitudinal direction of each block, and the longitude and latitude of the acquired positioning information, and identifies the position in the block data of the segment corresponding to the acquired positioning information using size information for each segment in the block, and acquires the time difference data for that segment.

This aspect of the invention can easily calculate and determine the block and segment to which the acquired positioning information corresponds. As a result, the amount of data to be stored can be further reduced because preparing a table correlating the positioning information (longitude and latitude) and the block data, or a table correlating the positioning information (longitude and latitude) and the segments, is not necessary.

An electronic device according to another aspect of the invention further preferably has a time calculation means that calculates a current time based on time information acquired by the reception unit and time difference data acquired by the time difference data acquisition means, and a time display means that displays the current time.

This time calculation means in this aspect of the invention can calculate the time at the current location of the electronic device using the time difference data acquired by the time difference data acquisition means and the time information acquired by the reception unit, can display this time on the time display means, and can therefore easily display the local time at the current location. Convenience is therefore particularly good for users that move between different time zones.

Another aspect of the invention is a time difference data acquisition method for an electronic device having a reception unit that can receive satellite signals transmitted from positioning information satellites and acquire positioning information and time information, and a time difference data storage means in which a data table and a memory address table are stored. The data table being rendered by dividing geographical information to which time difference data is assigned into segments of a constant size, setting only one time difference in each segment, grouping the segments into blocks each containing a specific number of segments, and storing the time difference data of each segment as block data by block unit while storing the block data only once for blocks containing the same time difference data array and storing the block data for mutually different time difference data arrays once each. The memory address table storing the memory address where the block data for each block is stored in the data table. The time difference data acquisition method includes steps of: identifying the block corresponding to the positioning information acquired by the reception unit; reading the memory address corresponding to said block from the memory address table; acquiring the block data indicated by the memory address in the data table; and acquiring the time difference data for the segment corresponding to the positioning information from said block data.

As in the electronic device described above, this aspect of the invention can reduce the amount of data to be stored while assuring the required accuracy, and therefore enables acquiring time difference data with the required accuracy even in electronic devices in which the external memory capacity is limited by size or cost.

Furthermore, by setting the segment width and the block width to widths that are easy to calculate, time difference data can be acquired in a short time even in low performance systems that do not have a processor that can process floating point, multiplication, division, and similar operations.

Another aspect of the invention is a data structure for time difference data, including a data table that is rendered by dividing geographical information to which time difference data is assigned into segments of a constant size, setting only one time difference in each segment, grouping the segments into blocks each containing a specific number of segments, and storing the time difference data of each segment as block data by block unit while storing the block data only once for blocks containing the same time difference data array and storing the block data for mutually different time difference data arrays once each; and a memory address table that stores the memory address where the block data for each block is stored in the data table.

This aspect of the invention divides time difference regions into segments of a specific size, assigns the same time difference to the area within each segment, groups plural segments into blocks, and stores the block data in a data table. Because the time difference is set referenced to longitude, adjacent blocks often contain the same time difference data. As a result, because blocks containing the same data can be stored only once in the data table, the location in memory where the block data for each block is stored is stored in the memory address table and the block data can be read using this address, the amount of data to be stored can be greatly reduced.

Furthermore, by setting the segment width and the block width to widths that are easy to calculate, processing in a short time is possible even in low performance systems that do not have a processor that can process floating point, multiplication, division, and similar operations. As a result, the invention can be used for as a data structure suitable for data processing in small electronic devices, such as a wristwatch, that must use a system with low performance in terms of power consumption and cost.

Further preferably in a data structure for time difference data according to the invention, each unit of block data includes a number of times the time difference changes in that block data unit, the first time difference value, the first index of the n-th time difference value, and the n-th time difference value, where n is an integer of 2 or more.

This aspect of the invention can further reduce the amount of data to be stored because each block data unit in the data table can be compressed and stored in the data table. In addition, because the number of times the time difference changes and the first index of the same consecutive time difference are stored, time difference data for a particular segment can be easily acquired by a comparison operation.

BRIEF DESCRIPTION OF THE DRAWINGS

FIG. 7 shows an example of a time difference table.

FIG. 8 shows an example of a data table.

FIG. 9 describes a block data compression method.

FIG. 10 shows an example of a compressed data table.

FIG. 11 shows an example of a time difference table.

FIG. 12 shows an example of an offset table.

FIG. 13 shows an example of a compressed data table.

DESCRIPTION OF THE PREFERRED EMBODIMENTS

A preferred embodiment of the present invention is described below with reference to the accompanying figures.

The embodiment described below is a specific preferred embodiment of the present invention and certain technically preferred limitations are therefore also described, but the scope of the present invention is not limited to these embodiments or limitations unless specifically stated below.

GPS Wristwatch

Figure 1:
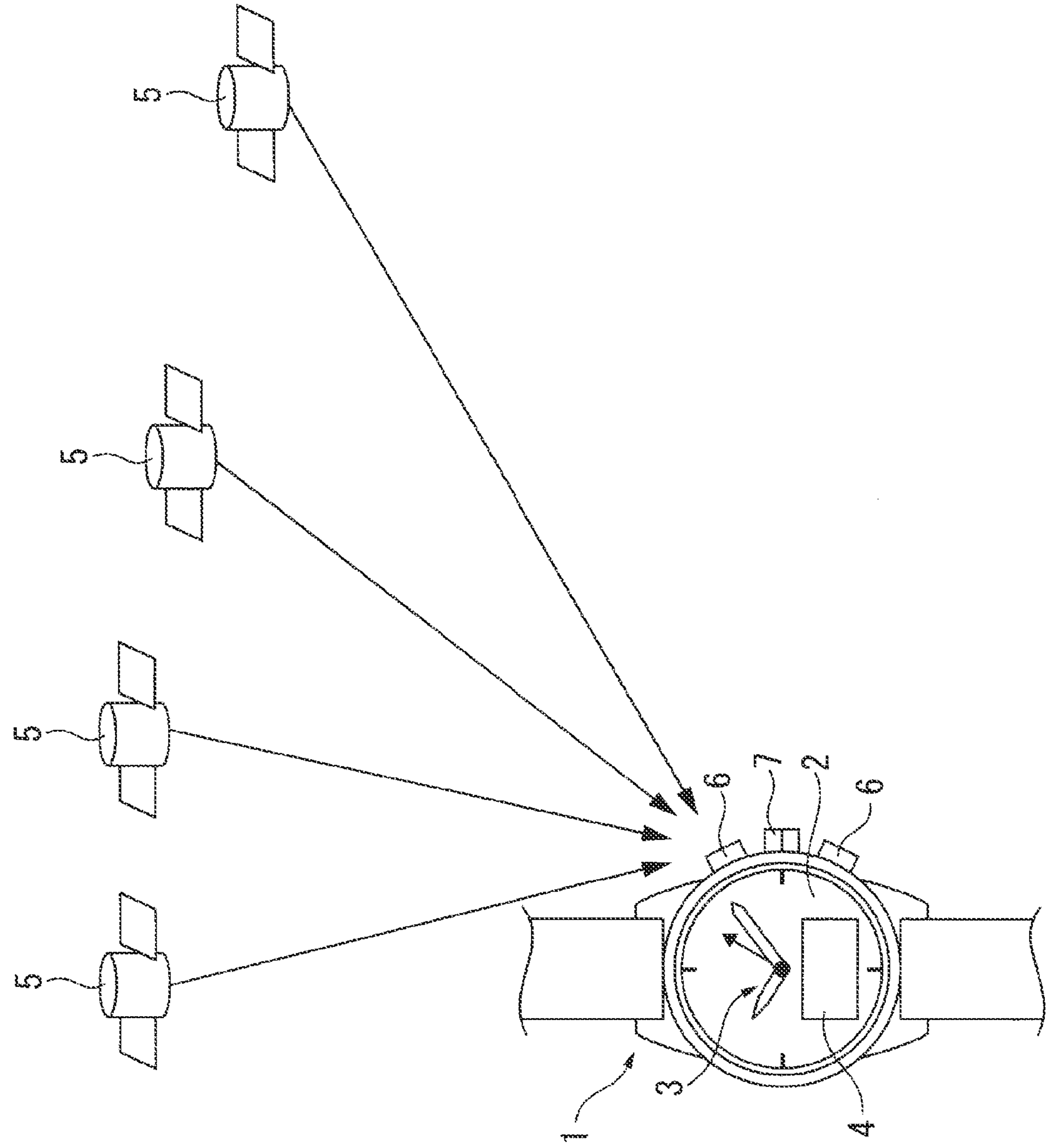
FIG. 1 schematic describes showing a GPS wristwatch according to a preferred embodiment of the invention.
Figure 2:
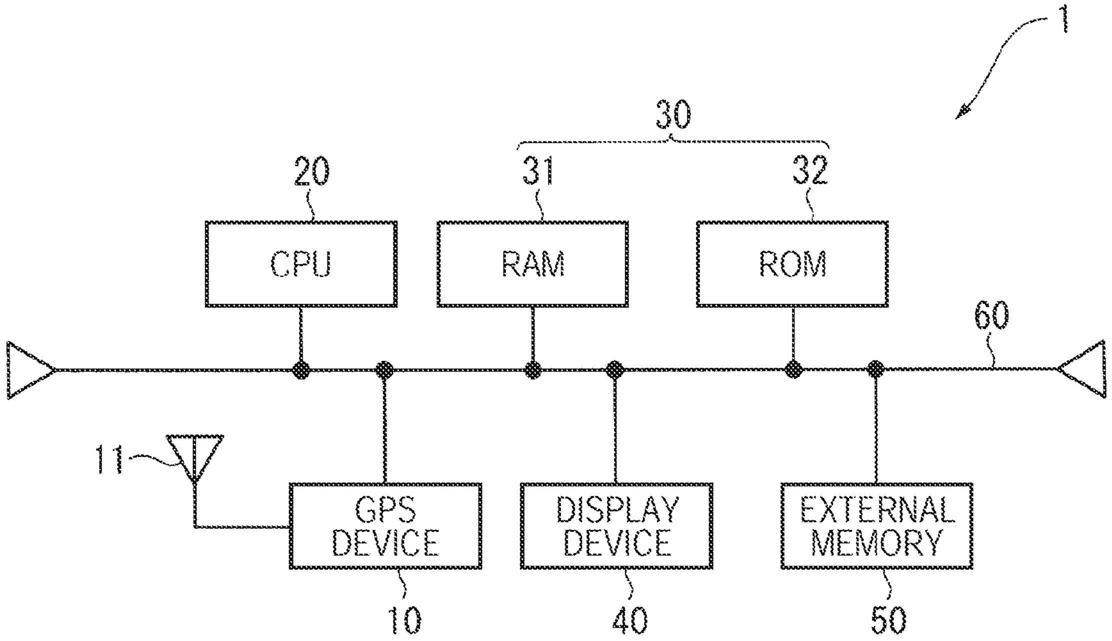
FIG. 2 is a block diagram showing the circuit configuration of the GPS wristwatch.

FIG. 1 is a schematic diagram showing a wristwatch with a GPS satellite signal reception device 1 (referred to below as a GPS wristwatch 1) as an example of an electronic timepiece according to the present invention. FIG. 2 shows the main hardware configuration of the GPS wristwatch 1.

As shown in FIG. 1, the GPS wristwatch 1 has a time display unit including a dial 2 and hands 3. A window is formed in a part of the dial 2, and a display 4 such as an LCD panel is located in this window. The GPS wristwatch 1 is thus a combination timepiece having both hands 3 and a display 4.

The hands 3 include a second hand, minute hand, and hour hand, and are driven through a wheel train by means of a stepping motor.

The display 4 is typically a LCD unit and is used for displaying the current time and messages in addition to time difference data as further described below.

The GPS wristwatch 1 receives satellite signals from a plurality of GPS satellites 5 orbiting the Earth on fixed orbits in space and acquires satellite time information to adjust the internally kept time and positioning information, that is, the current location, on the display 4.

The GPS satellite 5 is an example of a positioning information satellite in the invention, and a plurality of GPS satellites 5 are orbiting the Earth in space. At present there are approximately 30 GPS satellites 5 in orbit.

The GPS wristwatch 1 has a crown 7 and buttons 6 as input devices (external operating members).

Circuit Design of the GPS Wristwatch

As shown in FIG. 2, the GPS wristwatch 1 has a GPS device 10 (GPS module), a control device 20 (CPU), a storage device 30 (storage unit), a display device 40 (display unit), and external memory 50. The storage device 30 includes RAM 31 and ROM 32. Data is communicated between these different devices over a data bus 60, for example.

The display device 40 includes hands 3 and a display 4 for displaying the time and positioning information.

The power source for operating these devices is a primary battery or a storage cell. A storage cell may be recharged using a contactless charging method through electromagnetic induction, or a solar panel may be disposed to a portion of the dial 2 of the wristwatch 1 and the storage cell can be recharged using the power produced by the solar panel, for example.

GPS Device

The GPS device 10 has a GPS antenna 11 and acquires time information and positioning information by processing satellite signals received through the GPS antenna 11.

The GPS antenna 11 is a patch antenna for receiving satellite signals from a plurality of GPS satellites 5 orbiting the Earth on fixed orbits in space. The GPS antenna 11 is located on the back side of the dial 12, and receives RF signals through the crystal and the dial 2 of the GPS wristwatch 1.

The dial 2 and crystal are therefore made from materials that pass RF signals such as the satellite signals transmitted from the GPS satellites 5. The dial 2, for example, is plastic.

Although not shown in the figures, the GPS device 10 includes an RF (radio frequency) unit that receives and converts satellite signals transmitted from the GPS satellites 5 to digital signals, a baseband unit that correlates the reception signal and synchronizes with the satellite, and a data acquisition unit that acquires the time information and positioning information from the navigation message (satellite signal) demodulated by the baseband unit, similarly to a common GPS device.

The RF unit includes bandpass filter, a PLL circuit, an IF filter, a VCO (voltage controlled oscillator), an A/D converter, a mixer, a low noise amplifier, and an IF amplifier.

The satellite signal extracted by the bandpass filter is amplified by the low noise amplifier, mixed by the mixer with the signal from the VCO, and down-converted to an IF (intermediate frequency) signal. The IF signal mixed by the mixer passes the IF amplifier and IF filter, and is converted to a digital signal by the A/D converter.

The baseband unit includes a local code generator and a correlation unit. The local code generator generates a local C/A code (also referred to as a "local code" herein) that is identical to the C/A code used for transmission by the GPS satellite 5. The correlation unit calculates the correlation between this local code and the reception signal output from the RF unit.

If the correlation calculated by the correlation unit is greater than or equal to a predetermined threshold value, the generated local code and the C/A code used in the received satellite signal match, and the satellite signal can be captured (that is, the receiver can synchronize with the satellite signal). The navigation message can thus be demodulated by applying this correlation process to the received satellite signal using the local code.

The data acquisition unit acquires the time information and positioning information from the navigation message demodulated by the baseband unit. More specifically, the navigation message transmitted from the GPS satellites 5 contains subframe data such as a preamble and the TOW (Time of Week, also called the Z count) carried in a HOW (handover word). The subframe data is divided into five subframes, subframe 1 to subframe 5, and the subframe data includes the week number, satellite correction data including the satellite health, the ephemeris (detailed orbital information for the particular GPS satellite 5), and the almanac (approximate orbit information for all GPS satellites 5 in the constellation).

The data acquisition unit extracts a specific part of the data from the received navigation message, and acquires the time information and positioning information. The GPS device 10 thus renders a reception unit in this embodiment of the invention.

Storage Device and External Memory

A program, for example, that is run by the control device 20 is stored in ROM 32 in the storage device 30.

Time information, positioning information, and time difference data acquired by reception from the satellite are stored in RAM 31 in the storage device 30.

The external memory 50 is the time difference data storage means of the invention, and as further described below stores an offset table 51 and a data table 55. Note that because the external memory 50 is rewritable, the tables 51 and 55 can also be updated.

Control Device Configuration

Figure 3:
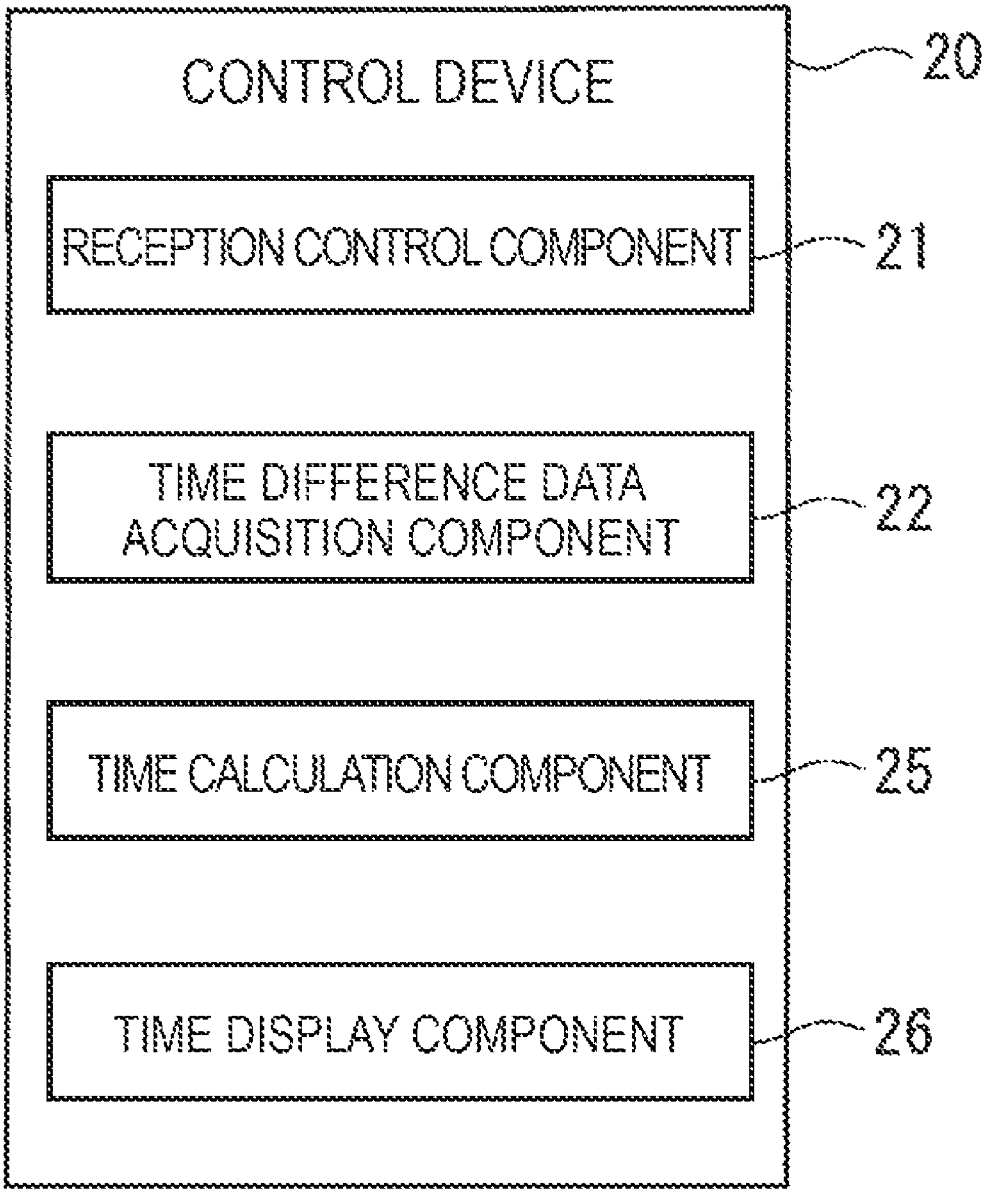
FIG. 3 is a block diagram showing the configuration of the control device of the GPS wristwatch.

The control device 20 (CPU) controls operation by running a program stored in ROM 32. As shown in FIG. 3, the control device 20 therefore includes a reception control component 21, a time difference data acquisition component 22, a time calculation component 25, and a time display component 26.

When the reception control component 21 detects a signal from an input device indicating that reception has been triggered by a button 6, the crown 7, or when a fixed reception time is set and the reception time arrives, the reception control component 21 drives the GPS device 10 to execute the satellite signal reception process.

Based on the position information (longitude and latitude) acquired by the GPS device 10, the time difference data acquisition means 22 acquires the time difference for the current location using the offset table 51, which is the memory address table of the accompanying claims, and data table 55 stored in the external memory 50.

The time calculation component 25 then calculates the current time at the current location (the local time) based on the time information acquired by the GPS device 10 (the GPS time+UTC offset) and the time difference data acquired by the time difference data acquisition means 22.

The time display component 26 normally displays the internal time, which is kept based on a reference signal output from an oscillation circuit, using the hands 3. The time display component 26 can also digitally display the internal time on the display 4.

When the local time has been calculated by the time calculation component 25, the internal time is adjusted and displayed according to the calculated local time. The corrected internal time is thereafter updated according to the reference signal.

The display device 40 is rendered by the hands 3 and display 4, and is controlled by the control device 20 as described above.

More specifically, the hands 3 are driven by a stepping motor and wheel train, and indicate the internally kept time, which is adjusted based on the received time data. The display 4 displays information such as the time and positioning information.

Data Structure of the Time Difference Data

The data structure of the time difference data stored in the offset table 51 and the data table 55, and a method of producing the time difference data, are described next.

Figure 4:
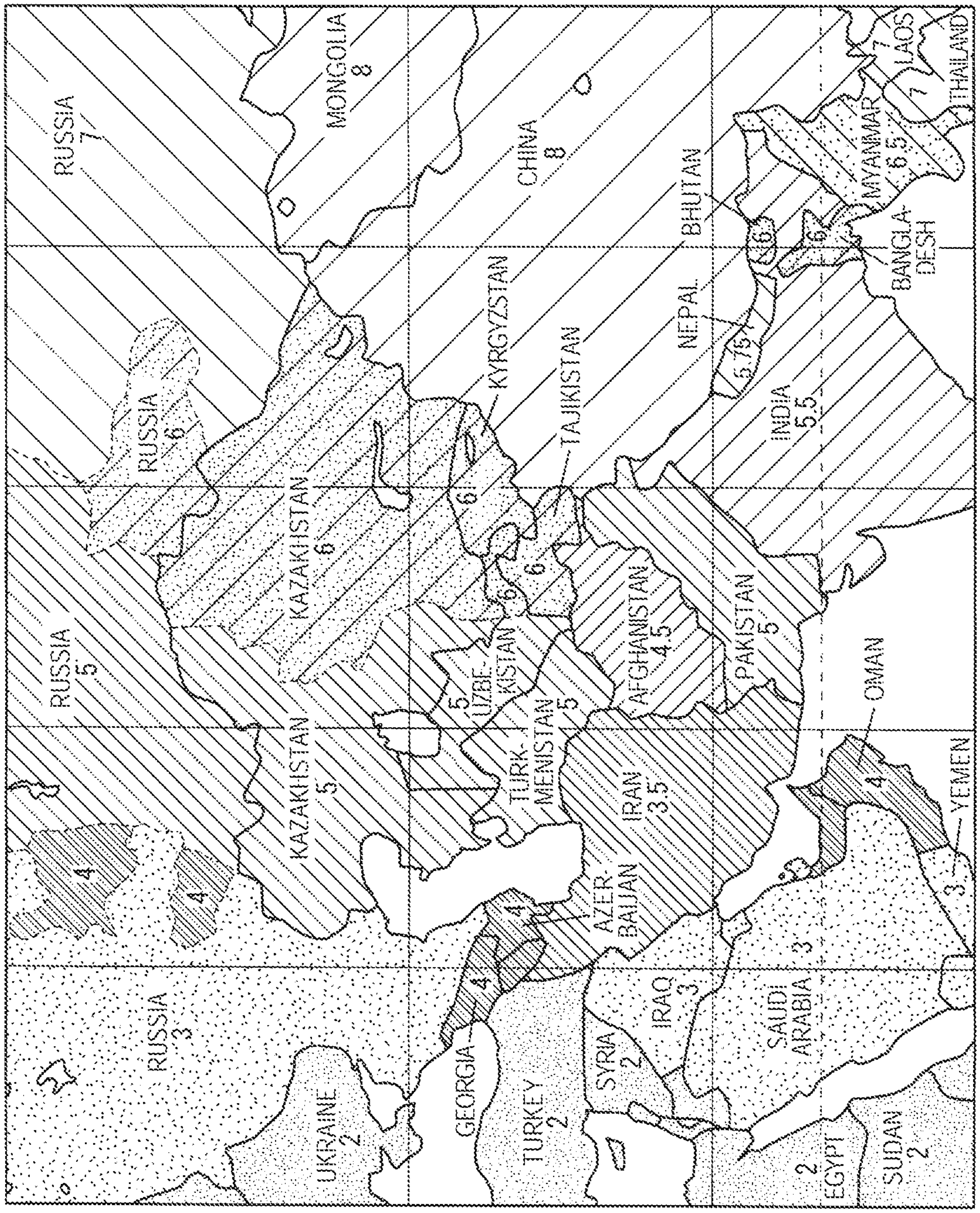
FIG. 4 shows an example of geographical information for which time difference data is set.

Because the time difference is the difference in time between the local time in a country or region and the UTC, it is theoretically set according to the longitude. However, the boundary lines of the actual time zones are often national borders that meander in different directions as shown in FIG. 4.

Figure 5:
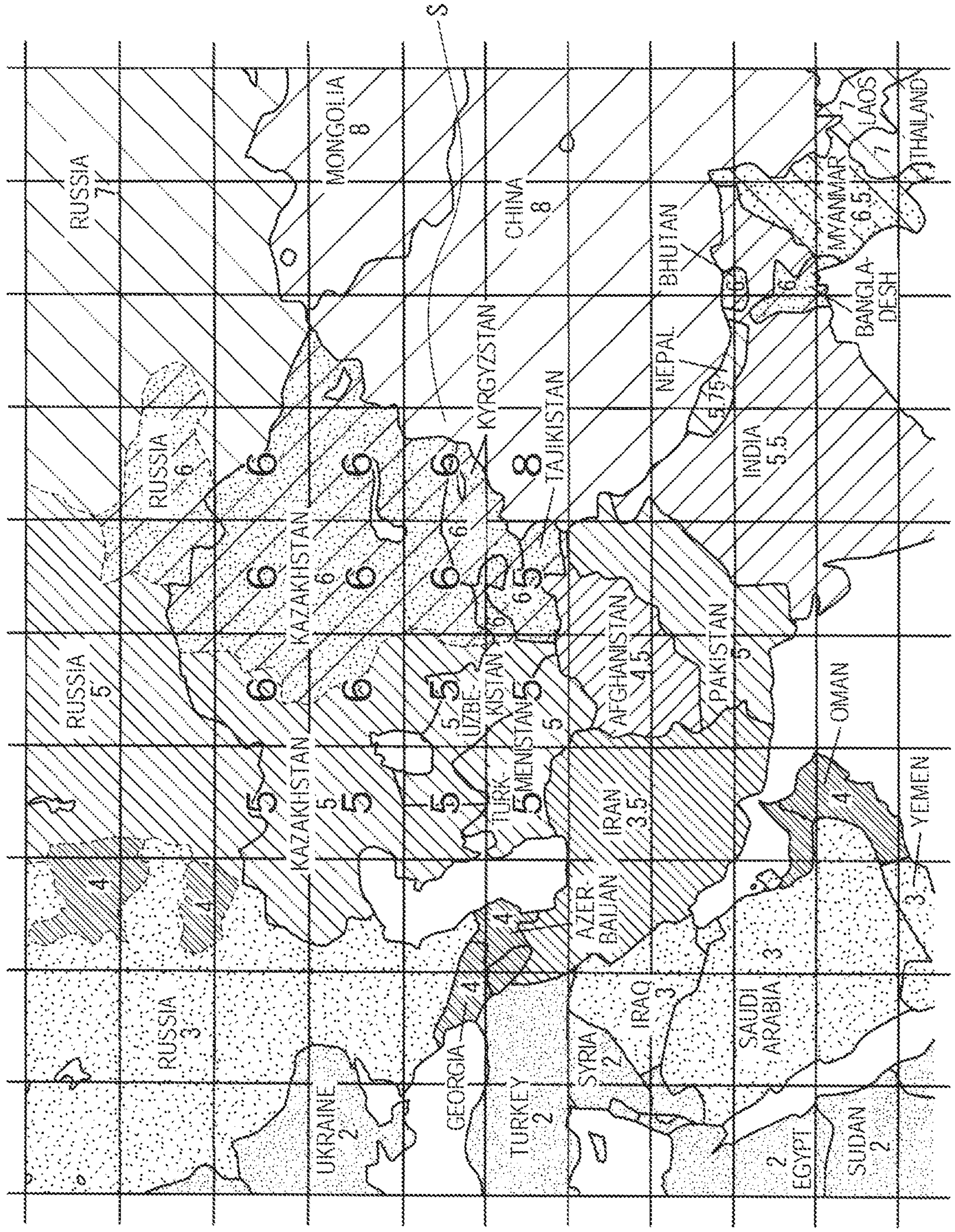
FIG. 5 shows an example of the segments into which geographical information is divided.

As shown in FIG. 5, the boundary data for time zones around the world is segmented by dividing the longitude and latitude lines into units of a constant width. The segments may be created using the same dimension for both longitude and latitude, or different dimensions may be set. More specifically, the width (size) of the longitude of each segment, and the width (size) of the latitude of each segment, may be the same or they may be different. All segments, however, are the same size.

In addition, if the width of the longitude and latitude is set to a size that is easy to compute, such as 1 degree, 30 minutes, or 10 minutes, they can be processed in a short time even on low performance systems that do not have a processor that can process floating point, multiplication, division, and similar operations.

A uniform time difference is also set for the entire area within each segment. For example, segment S in FIG. 5 includes a time zone with a time difference of +6 hours and a time zone with a time difference of +8 hours, but is unified to the time difference with the greatest area, that is, +6 hours in this example. To include areas with different time differences in different segments, the segment size may be changed. For example, by setting the longitudinal width of each segment to approximately ⅓ that shown in FIG. 5, these time zones can be separated and allocated to different segments.

The width of each segment may therefore be set with consideration for the time difference data in each region.

Figure 6:
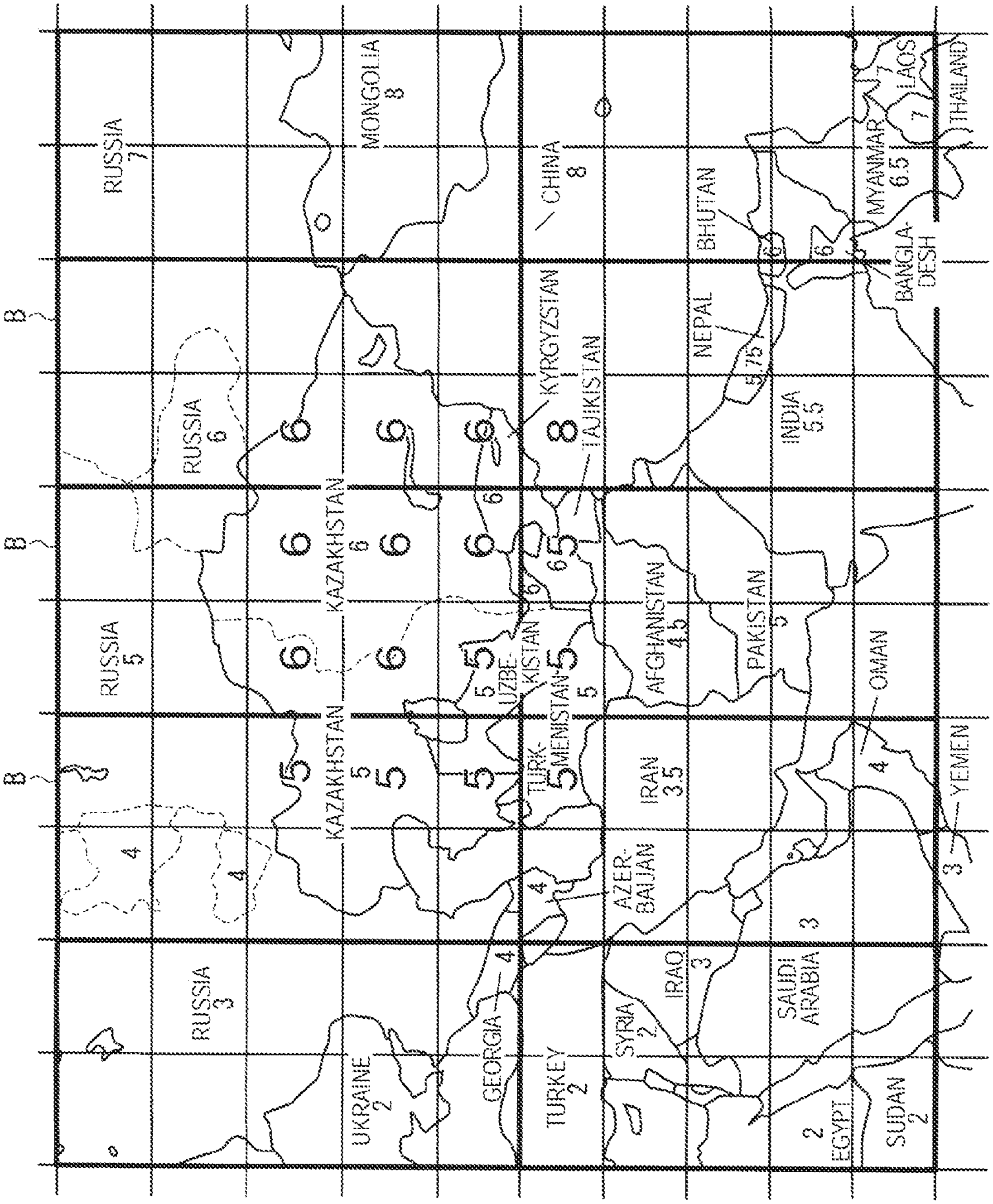
FIG. 6 shows an example of blocks into which the segments are grouped.

Next, as shown in FIG. 6, the segments for all areas are grouped into blocks. The number of segments in each block can be set using different values for the longitude and latitude. In the example shown in FIG. 6, each block B has a total 10 segments including two in the longitudinal direction and five in the latitudinal direction. All blocks B are set to the same size (have the same number of segments).

If the number of segments is set so that the block size is a width that is easy to compute, such as 1 degree, 10 degrees, or 90 degrees, the position of a block can be calculated in a short time even on low performance systems that do not have a processor that can process floating point, multiplication, division, and similar operations.

Block data composed of the time difference data for each segment in each block is stored in the data table 55. Because the time difference is determined referenced to longitude, the time difference data is often the same for adjacent blocks. The amount of data to be stored can therefore be reduced by grouping together block data in which the time difference data sequence is the same, and saving identical block data only once in the data table.

For example, there may be time difference data (a time difference table) such as shown in FIG. 7. In this example the width in the longitudinal direction (the horizontal rows in FIG. 7) of each block is equal to the width of one segment, and the width in the latitudinal direction (the vertical columns in FIG. 7) is equal to eight segments. For example, as shown in FIG. 7, if the numbers of the segments in the longitudinal direction are 0 to 7, and the numbers of the segments in the latitudinal direction are 0 to 15, block data B0 at the top left of the time difference data is composed of segment number 0 in the longitudinal direction, and the 8 segments of segment numbers 0-7 in the latitudinal direction.

In the time difference data shown in FIG. 7, the four sets of block data B0 shown at the top left show that the time difference for each segment is 0 (hr). In block data B2, the fourth block from the right on the bottom row, the time difference in each of the segments is +1, +1, 0, 0, +1, +1, +1, +1 (hr) sequentially from the top. In the other block data B1, the time difference in each of the segments is 0, 0, 0, 0, +1, +1, +1, +1 (hr) sequentially from the top.

Therefore, while the time difference data shown in FIG. 7 contains 16 block data arrays, these can be reduced to only the three different arrays of block data B0, B1, and B2 as shown in FIG. 8 because it is only necessary to store block data having the same sequence of time difference data once. Compared with storing each of the 16 block data arrays, the amount of data stored can therefore be reduced to 3/16= approximately 19%.

While the amount of data can be reduced by the above process, this embodiment of the invention also applies a data compression process to further reduce the amount of data stored in the data table 55.

More specifically, the time difference data for the segments in a block often contains the same time difference repeated consecutively. This feature can therefore be used to compress the data using a run-length data compression method, for example.

Note that common run-length compression methods compress the data by encoding consecutive identical values using the data value and the length of the run, but this requires a mathematical operation to acquire the time difference data of any segment at a particular position in each block data array. This embodiment of the invention therefore uses an improved run-length encoding method.

More specifically, the data in each data table 55 is stored using the format shown in FIG. 9, that is, the number of times the time difference changes, the first time difference, the first index to the second time difference, the second time difference, and so forth to the first index to the n-th (that is, the last) time difference, and the n-th (that is, the last) time difference.

For example, in block data B2 the time difference changes twice: from +1 to 0 to +1. If as shown in FIG. 8 the indices to the eight time difference values in block data B2 are 0 to 7, block data B2 changes to a time difference of 0 at index 2, and changes to a time difference of +1 at index 4.

Therefore, in block data B2, the number of times the time difference changes is 2, the first time difference is +1, the first index of the second time difference is 2, the second time difference is 0, the first index of the third time difference is 4, and the third time difference is +1. As a result, block data B2 is compressed and recorded as the values 2, +1, 2, 0, 4, +1 as shown in FIG. 10.

Likewise, because block data B0 contains only the time difference 0, block data B0 can be expressed using 0 denoting the number of times the time difference changes, and 0 denoting the first time difference. Similarly, block data B1 can be expressed using 1 denoting the number of times the time difference changes in block data B1, 0 denoting the first time difference, 4 as the first index to the second time difference, and +1 as the second time difference.

An advantage of the method according to this embodiment of the invention is that a simple comparison operation can be used to retrieve the time difference of a segment at a particular position.

Time difference data is compressed and stored in the data table 55 by the method described above. In the example shown in FIG. 7, there are 16 blocks each containing 8 time difference values, these values can be reduced to the 12 data values in the data table shown in FIG. 10, and the time difference data can therefore be reduced to 12/(8*16)=approximately 10% of the original size.

An offset table 51 (memory address table) stores offset addresses denoting the memory address of the block data B0, B1, and B2 in the data table 55.

More specifically, the offset address of each block data array is stored in a two-dimensional array in the offset table 51. That is, as shown in FIG. 11, if A and B are the latitude indices and 0 to 7 are the longitude indices to the block data, the corresponding offset addresses are stored in the array (A,0) to (B,7) in the offset table 51 as shown in FIG. 12.

Because the offset address 0x0000 is assigned to block data B0, 0x0002 is assigned to block data B1, and 0x0006 is assigned to block data B2 in data table 55 as shown in FIG. 13, these address values are stored in the offset table 51 in this embodiment of the invention.

Note that "0x" is a prefix denoting hexadecimal notation in each offset address, and indicates that the following four digits are hexadecimal values. Therefore, an offset address of 0x0000 indicates the hexadecimal address 0000 in the data table 55.

Reception Process and Time Difference Data Acquisition Process

The reception process and time difference data acquisition process of the GPS wristwatch 1 are described next with reference to the flow chart in FIG. 14.

Figure 14:
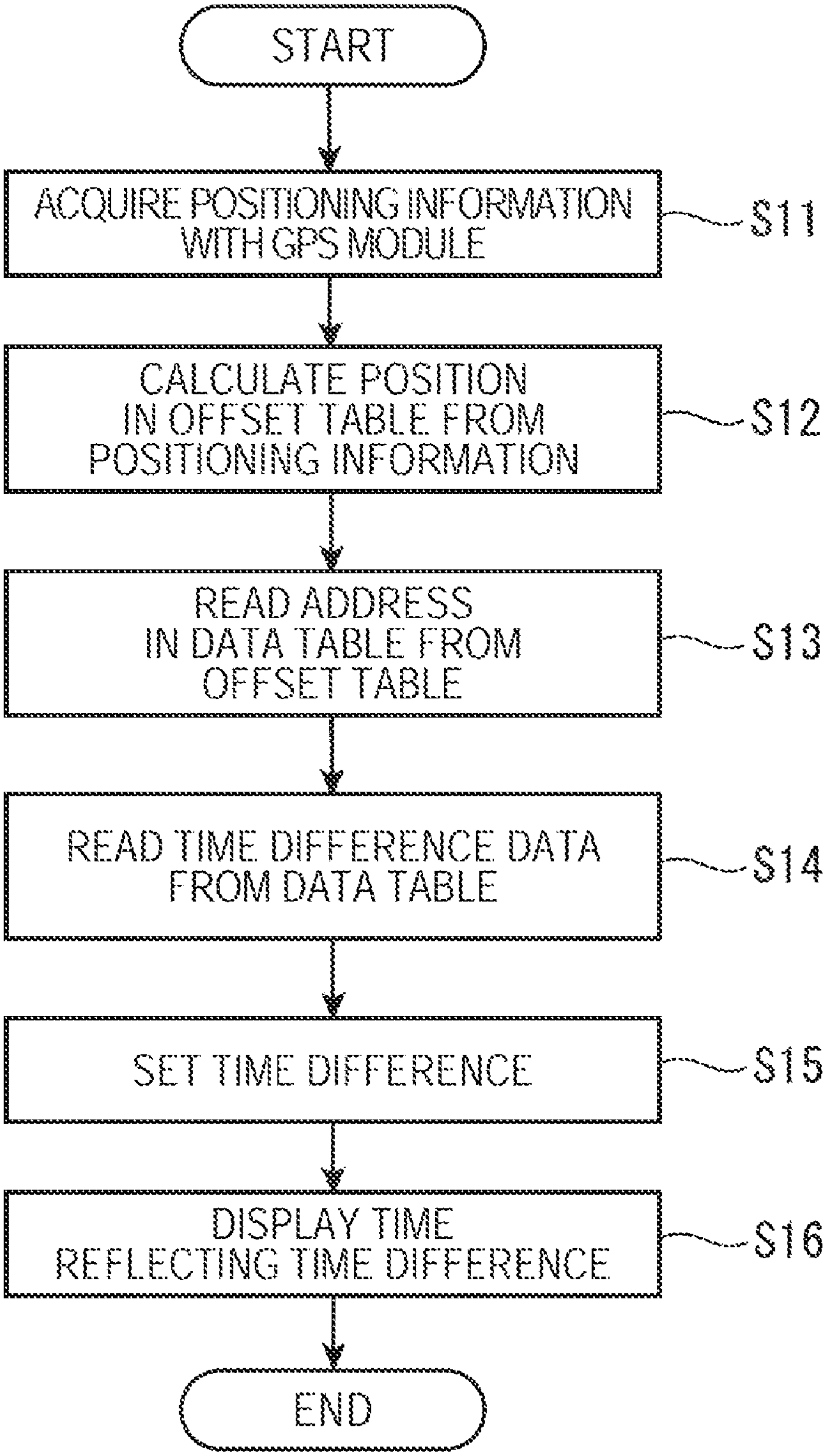
FIG. 14 is a flow chart describing the reception process of a preferred embodiment of the invention.

The process shown in FIG. 14 is normally executed when the user initiates reception. More specifically, in order to get positioning information, that is, determine one's position, ephemeris data, which is the current precise orbit information of a particular GPS satellite 5, must be received from four satellites. Acquiring this ephemeris parameter from four GPS satellites 5 takes approximately 60 seconds, during which time power consumption is relatively high. The user can therefore start the reception process when it is necessary to receive the positioning information, or when it is necessary to set the time of the GPS wristwatch 1, such as when traveling from home to another country or when returning home from another country. When the reception process is set to be executed automatically at a preset time, the process shown in FIG. 14 may also be executed when that time comes.

When the reception process starts, the reception control component 21 of the control device 20 drives the GPS device 10 (GPS module) to acquire the positioning information (S11). Note that because the time information can be acquired simultaneously to acquiring the positioning information, the time information is also acquired in step S11. The reception control component 21 stores the positioning information and the time information acquired by reception in RAM 31 at this time.

The time difference data acquisition means 22 then calculates a position in the offset table 51 based on the acquired positioning information (S12). More specifically, the time difference data acquisition means 22 calculates the position (index) in the offset table 51 where the block corresponding to the acquired positioning information is located.

Because the block data indices are assigned from a predetermined reference point, the block data to which a particular index corresponds can be calculated if the size of the block data and the longitude and latitude are known.

For example, if the latitudinal width of the block data is set to 30° such that index A is set to the range from 90° to 60° north latitude, index B is set to the range from 60° to 30° north latitude, and so forth, the blocks from 90° to 0° north latitude and from 0° to 90° south latitude can be identified using the indices A to F. If the positioning information identifies a location at 35° 40' north latitude (that is, near Tokyo Station), a location corresponding to index B in this example can be easily calculated.

Likewise, if the longitudinal width of the block data is set to 1° such that index 0 identifies the range from 0° to 1° east longitude, index 1 identifies the range from 1° to 2° east longitude, and so forth, the range from 0° to 180° east longitude and from 180° to 0° west longitude can be sequentially set to indices 0 to 359. Therefore, if the positioning information identifies a location at 139° 46' (that is, near Tokyo Station), a location corresponding to index 139 in this example can be easily calculated.

Therefore, because the reference point and size of the block data are known in advance, if the longitude and latitude are known, the block data to which the current location corresponds can be easily calculated. The block data at (B, 139) is thus obtained for Tokyo Station in this example.

Next, the time difference data acquisition means 22 reads the address (location in memory) of the data table 55 from the offset table 51 (S13). For example, in the example shown in FIG. 12, if the block corresponding to the positioning information is (A, 4), the offset address 0x0002 is read.

The time difference data acquisition means 22 then reads the time difference data from the data table 55 based on the address of the data table 55 that was read (S14).

More specifically, the process executed in step S14 is as follows.

Because the width (size) of each segment in the block data is known, the time difference data acquisition means 22 can know the number of the segment from the positioning information.

For example, when the size of the block data is set to 30° latitude and 1° longitude, the block data is composed of segments of 5° latitude and 1° longitude. In this configuration there are six segments in the block data, that is, 6 latitudinally and 1 longitudinally. For example, the block data (B, 139) containing the above location at 35° 40' north latitude and 139° 46' east longitude contains 6 segments. If the index for the range from 60°-55° north latitude is 0, the index for the range from 55°-50° north latitude is 1 and so forth to an index of 4 for the range from 40°-35° north latitude and an index of 5 for the range from 35°-30° north latitude, the location at 35° 40' north latitude is in the segment at index 4. More specifically, the location at 35° 40' north latitude corresponds to segment 5 counted from the segment at index 0.

Once the number of the segment in the block data is known, the time difference data acquisition means 22 can read the time difference data for that segment by sequentially reading the block data stored in the data table 55.

For example, if in the data table 55 shown in FIG. 13 the segment is contained in block data B0, the time difference data acquisition means 22 can learn that the number of times the time difference changes is 0 because the first data value in block data B0 is 0. Because the time difference for all segments in block data B0 is also known to be the first time difference of 0, a time difference of 0 hours can be acquired for the corresponding positioning information by reading the first time difference value.

Furthermore, if the segment is contained in block data B1, the number of times the time difference changes is 1, and the first index of the second time difference is 4. Therefore, if the index of the segment corresponding to the positioning information is from 0 to 3, the time difference is known to be 0 by reading the first time difference and then reading to the first index of the second time difference. In addition, if the index is from 4 to 7, the time difference is known to be +1 once the data is read to the second time difference value.

Likewise, if the segment is contained in block data B2 and the index of the segment corresponding to the positioning information is 0 or 1, the time difference is known to be +1 by reading the first time difference and then reading to the first index of the second time difference. If the index is 2 or 3, the time difference is known to be 0 by reading to the first index of the third time difference after reading the second time difference. In addition, if the index is from 4 to 7, the time difference is known to be +1 once the third time difference value is read.

The time calculation component 25 then stores the time difference data acquired by the time difference data acquisition means 22 in the time difference storage area in RAM 31, and sets the time difference (S15). The time calculation component 25 then adds the UTC offset and the time difference to the received GPS time. More specifically, because the GPS time corrected by the UTC offset is the same as the Coordinated Universal Time (UTC), the current time at the current location can be acquired by adding the time difference to the UTC.

For example, if the time difference acquired from the positioning information is +9, the time calculation component 25 sets the time difference to UTC to +9, and if the GPS time plus the UTC offset, that is, the UTC, is 1:10, for example, a local time at the current location of 10:10 is obtained by adding 9 hours to UTC.

Note that because the time difference setting is stored in RAM 31 as described above, if only the time information is later received from a GPS satellite 5, the time calculation component 25 can calculate the current local time by adding the time difference stored in RAM 31 to the acquired time information.

The time display component 26 then displays the time calculated by the time calculation component 25, that is, the current time reflecting the time difference added to the GPS time.

More specifically, the time display component 26 drives the stepping motor to quickly move the hands 3 to the positions indicating the calculated time. The acquired positioning information, time difference, and calculated time, for example, are also displayed on the display 4.

The reception process for correcting the displayed time to the current local time thus ends.

Effect of the First Embodiment

The effect of this embodiment of the invention is described next.

When the time difference data is saved, the time difference areas are divided into segments of a constant size, the same time difference is assigned to the area inside each individual segment, and the segments are then grouped into blocks each containing a plurality of segments. Because the time difference is set referenced to longitude, adjacent blocks often contain the same time difference data. This characteristic can be used to store blocks containing the same data only once in the data table 55, and the total amount of data stored can thereby be greatly reduced.

In addition, because the location in memory where the block data corresponding to each block is stored is also stored in a memory address table, the block data corresponding to each block can be reliably read even if identical block data is stored only once in the data table 55. Therefore, time difference data with the required accuracy can be stored even in an electronic device such as a wristwatch 1 in which the capacity of the external memory 50 is limited by size or cost.

In addition, the time difference data for adjacent segments in each block data array in the data table 55 is often a consecutive run of the same time difference data. Because this characteristic is used to compress the block data stored in the data table 55, the amount of data can be further reduced. For example, the amount of data can be reduced to less than or equal to 1/10 the amount of data stored when the segment data is not compressed.

Furthermore, because a characteristic of the time difference data is that the same value often occurs consecutively in the block data, the data can be compressed using an improved run-length compression method, and the time difference data for a particular segment in the block data can be easily read using a comparison operation. This improved run-length compression method first records how many times the time difference changes in the array, then records the first time difference, records the first index of the n-th time difference, and records the n-th time difference.

More specifically, run-length compression methods generally record a value and the length of the continuous run of that value. As a result, to read the time difference information for a segment at a particular position in the block (such as the n-th segment), the length must be added to each data value while comparing with n in order to acquire the n-th data value.

However, because the invention stores the first index of each data value, the time difference data can be acquired by sequentially reading the block data from the data table 55 and comparing each first index with the particular desired position (n), and there is no need for an adding operation.

Furthermore, because the size of each segment and the block size are uniform, the block and segment to which the acquired positioning information corresponds can be easily calculated. As a result, a table correlating positioning information (longitude and latitude) to block data, such as a table showing that 90° to 60° north latitude corresponds to index A, 60° to 30° corresponds to B, 0° to 1° east longitude corresponds to index 0, 1° to 2° corresponds to index 1, and so forth, does not need to be separately provided, and the amount of data to be stored can be reduced accordingly.

Likewise, because a table correlating the positioning information (longitude and latitude) and segments is also not necessary, the amount of data to be stored can be further reduced.

Furthermore, by setting the segment width and the block width to widths that are easy to calculate, processing in a short time is possible even in systems that do not have a processor that can process floating point, multiplication, division, and similar operations. As a result, the invention can be used in small electronic devices, such as a wristwatch 1, that must use a system with low performance in terms of power consumption and cost.

Yet further, because power consumption can be reduced, the duration time of the electronic device can be increased, the interval between recharging or battery replacement can be increased, and an electronic device that is easy to use can be provided.

If the positioning information can be acquired, the GPS wristwatch 1 can also automatically acquire the time difference data. As a result, the local time at the current location can be easily displayed, and user convenience can be improved particularly for users that travel between different time zones.

Furthermore, the accuracy of the time difference data an be adjusted using by means of the segment size. Therefore, time difference data with the required accuracy can be acquired if the segment size is set according to the application.

Furthermore, because the capacity of the internal memory (storage device 30) is small in small (portable) electronic devices such as a GPS wristwatch 1, the time difference data must be stored in external memory 50. Furthermore, because the addresses that can be allocated on the memory map are also limited, data must be read from external memory 50 through some type of data communication means such as a serial interface.

This embodiment of the invention can calculate and determine the address storage position (the index of the block data) in the offset table 51 from the positioning information, and can determine the memory address (offset address) in the data table 55 from the data stored in the offset table 51. The time difference data can therefore be acquired with the fewest memory access operations.

Variations

The invention is not limited to the foregoing embodiment.

For example, the segment size may be set according to the accuracy required in the time difference data.

The block size may also be set appropriately according to the capacity of the external memory 50 and the performance of the processor in the electronic device in which the invention is used.

The relationship between the amount of data in blocks of a given size and the number of process steps is as shown in Table 1.

TABLE 1

| | Amount of data | | | |
|---|---|---|---|---|
| Block size | Offset table | Data table | Total amount of data | Number of steps |
| Large | decreases | increases | decreases | increases |
| Small | increases | decreases | increases | decreases |

More specifically, if the block size is large, the number of blocks decreases, and the amount of data in the offset table 51 can be decreased. However, if the block size increases, the number of blocks with different data patterns also increases, and the amount of data stored in the data table 55 increases. However, as will be understood from the foregoing embodiment, the data stored in the data table 55 can be compressed, and the total amount of data stored in the offset table 51 and data table 55 combined decreases because the original amount of data is small compared with the offset table 51. However, because the block size is large, the number of steps processed increases.

However, if the block size is small, the number of blocks increases, and the amount of data in the offset table 51 increases. In addition, if the block size is small, the number of blocks with the same data patterns also increases, and the amount of data stored in the data table 55 decreases. As a result, the total amount of data stored in the offset table 51 and data table 55 combined increases. Because the block size is small, the number of steps processed decreases.

As a result, in a system with a low clock frequency and low performance processor, the number of steps to be processed can be decreased and the time difference can be determined in a short time by reducing the block size to the extent enabled by the capacity of the external memory 50.

On the other hand, in a system with a high clock frequency and high performance processor, the processing time can be shortened even if the block size is increased and the number of steps to be processed is increased, and the amount of data can be reduced as much as possible.

Therefore, in a mobile electronic device such as a GPS wristwatch 1, the block size is preferably reduced to the extent enabled by the memory capacity so that the time difference data can be acquired even in a system with a low clock frequency and low performance processor.

Furthermore, in the example of a time difference table shown in FIG. 11 according to this embodiment of the invention, each block is configured with one segment in the longitudinal direction, but plural segments may also be set in the longitudinal direction as shown in the blocks in FIG. 6. The sequence of the time difference data in each segment in the block data can be preset as desired in this configuration. For example, using the blocks shown in FIG. 6 by way of example, the time difference data may be arranged from top to bottom starting from the left column, and then proceed from top to bottom in the right column.

The block data stored in the data table 55 may also be stored uncompressed as shown in FIG. 8, and it may be compressed using a different compression method than the method described in the foregoing embodiment.

Yet further, the foregoing embodiment is described using a combination analog and digital timepiece having both hands 3 and a display 4, but can obviously also be applied to a digital timepiece that does not have hands.

The electronic device of the invention is also not limited to wristwatches, and may be a pocket watch or any type of electronic timepiece that is used portably.

The electronic device of the invention may also be various types of electronic devices having other functions in addition to a timepiece function. For example, the invention can be broadly applied in cell phones with a GPS function and a timepiece function, navigation devices with a GPS function used when hiking, and other types of electronic devices.

The electronic device may also not be equipped with a time display component and may output time data, for example, to an external device. For example, the electronic device may be a device that can be connected to an external interface of a personal computer, and configured to output the acquired time difference data, positioning information, and time information.

The time difference data with the data structure of the invention may also be supplied to other electronic devices by means of various storage media or a network. As a result, time difference data sets using different segment sizes and block sizes may be prepared, and the user could be enabled to select the time difference data stored in the electronic device. In this configuration, time difference data with accuracy suitable to the environment can be provided by, for example, providing time difference data compiled with small segments to devices that are used in regions with complexly intertwining time zone boundaries.

The foregoing embodiments are described with reference to a GPS satellite as an example of a positioning information satellite, but the positioning information satellite of the invention is not limited to GPS satellites and the invention can be used with Global Navigation Satellite Systems (GNSS) such as Galileo (EU), GLONASS (Russia), and Beidou (China), and other positioning information satellites that transmit satellite signals containing time information, including the SBAS and other geostationary or quasi-zenith satellites.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An electronic device comprising:

a reception unit that can receive satellite signals transmitted from positioning information satellites and acquire positioning information and time information;

a time difference data storage means in which a data table and a memory address table are stored; and a time difference data acquisition means that acquires time difference data corresponding to positioning information acquired by the reception unit from the time difference data storage means;

the data table comprising a first block of data having a first array of time difference data and a second block of data having a second array of time difference data that is different than the first array of time difference data;

the memory address table storing the memory address of each of the first and second blocks of data, at least one of the first and second blocks of data being stored a plurality of times in the memory address table; and the time difference data acquisition means identifying a block of data corresponding to the positioning information acquired by the reception unit, reading the memory address corresponding to the block of data from the memory address table, acquiring the block of data indicated by the memory address in the data table, and acquiring the time difference data for the segment corresponding to the positioning information from the block of data.

2. The electronic device described in claim 1, wherein:

each block of data stored in the data table includes a number of times the time difference changes in that block of data, a first time difference value, a first index of an n-th time difference value, and the n-th time difference value, where n is an integer of 2 or more.

3. The electronic device described in claim 1, wherein:

the time difference data acquisition means calculates and determines the index of the block of data corresponding to the acquired positioning information using longitude and latitude information to which the index of each block of data in the memory address table is referenced, size information for the latitudinal direction and longitudinal direction of each block of data, and the longitude and latitude of the acquired positioning information, and identifies the position in the block of data of the segment corresponding to the acquired positioning information using size information for each segment in the block of data, and acquires the time difference data for that segment.

4. The electronic device described in claim 1, further comprising:

a time calculation means that calculates a current time based on time information acquired by the reception unit and time difference data acquired by the time difference data acquisition means; and a time display means that displays the current time.

5. A time difference data acquisition method for an electronic device having a reception unit that can receive satellite signals transmitted from positioning information satellites and acquire positioning information and time information, and a time difference data storage means in which a data table and a memory address table are stored;

the data table comprising a first block of data having a first array of time difference data and a second block of data having a second array of time difference data that is different than the first array of time difference data; and the memory address table storing the memory address of each of the first and second blocks of data, at least one of the first and second blocks of data being stored a plurality of times in the memory address table; and the time difference data acquisition method comprising steps of:

identifying the block of data corresponding to the positioning information acquired by the reception unit;

reading the memory address corresponding to the block of data from the memory address table;

acquiring the block of data indicated by the memory address in the data table; and acquiring the time difference data for the segment corresponding to the positioning information from the block of data.

6. A data structure for time difference data, comprising:

a first block of data having a first array of time difference data and a second block of data having a second array of time difference data that is different than the first array of time difference data; and a memory address table that stores the memory address of each of the first and second blocks of data, at least one of the first and second blocks of data being stored a plurality of times in the memory address table.

7. The data structure for time difference data described in claim 6, wherein:

each block of data includes a number of times the time difference changes in that block of data, a first time difference value, a first index of an n-th time difference value, and the n-th time difference value, where n is an integer of 2 or more.

* * * * *